(12) United States Patent
Van Der Vleuten et al.

(10) Patent No.: US 9,014,498 B2
(45) Date of Patent: Apr. 21, 2015

(54) ENCODING A SIGNAL INTO A SCALABLE BITSTREAM AND DECODING SUCH BITSTREAM

(75) Inventors: Renatus Josephus Van Der Vleuten, Eindhoven (NL); Bas Driesen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 564 days.

(21) Appl. No.: 13/377,901

(22) PCT Filed: Jun. 8, 2010

(86) PCT No.: PCT/IB2010/052540
§ 371 (c)(1),
(2), (4) Date: Dec. 13, 2011

(87) PCT Pub. No.: WO2010/146496
PCT Pub. Date: Dec. 23, 2010

(65) Prior Publication Data
US 2012/0093429 A1    Apr. 19, 2012

(30) Foreign Application Priority Data
Jun. 16, 2009   (EP) ..................................... 09162838

(51) Int. Cl.
*G06K 9/36*     (2006.01)
*H04N 19/129*   (2014.01)
(Continued)

(52) U.S. Cl.
CPC ........... *H04N 19/129* (2014.11); *H04N 19/647* (2014.11); *H04N 19/63* (2014.11)

(58) Field of Classification Search
USPC .................................. 382/232, 233, 240, 250
See application file for complete search history.

(56) References Cited

U.S. PATENT DOCUMENTS 6,556,719 B1   4/2003   Monro
6,683,991 B1   1/2004   Andrew et al.
(Continued)

FOREIGN PATENT DOCUMENTS

JP    H06339030 A    12/1994
JP    2004274773     9/2004
(Continued)

OTHER PUBLICATIONS

Kim et al: "Fine Granular Scalable Video Coding Using Context-Based Binary Arithmetic Coding for Bit-Plane Coding"; IEEE Transactions on Circuits and Systems for Video Technology, vol. 17, No. 10, Oct. 2007, pp. 1301-1310.

*Primary Examiner* — Duy M Dang

(57) ABSTRACT

The invention relates to a bit-plane coding method of signals, for example, an image or video signal in the DCT transform domain. The bit planes of the DCT blocks are transmitted bit-plane by bit-plane in order of significance. As each plane contains more signal energy than the lower significant layers together, the resulting bitstream is scalable in the sense that it may be truncated at any position. The later the bitstream is truncated, the smaller the residual error when the image is reconstructed. For each bit plane, a zone or partition of bit plane is created that encompasses all the non-zero bits of the DCT coefficients in that bit plane. The partition is created in accordance with a strategy that is selected from a number of options in dependence of the content of the overall signal and/or the actual bit plane. A different zoning strategy may be used for natural images than for graphic content, and the strategy may vary from bitplane to bitplane. The form as well as other properties such as size of each partition can thus be optimally adapted to the content. Two-dimensional rectangular zones and one-dimensional zigzag scan zones may be mixed within an image or even within a DCT block. The selected zone creating strategy is embedded in the bitstream, along with the DCT coefficient bits in the actual partition.

13 Claims, 4 Drawing Sheets

(51) Int. Cl.
*H04N 19/64* (2014.01)
*H04N 19/63* (2014.01)

(56) References Cited

U.S. PATENT DOCUMENTS

| | | |
|---|---|---|
| 2004/0179617 A1 | 9/2004 | Cai et al. |
| 2007/0071090 A1 | 3/2007 | Peng et al. |
| 2009/0265744 A1 | 10/2009 | Singh et al. |

FOREIGN PATENT DOCUMENTS

| | | |
|---|---|---|
| JP | 2007088826 A | 4/2007 |
| WO | 0191454 A2 | 11/2001 |
| WO | 03045067 A1 | 3/2003 |
| WO | 2005112467 A1 | 11/2005 |

# ENCODING A SIGNAL INTO A SCALABLE BITSTREAM AND DECODING SUCH BITSTREAM

FIELD OF THE INVENTION

The present invention relates to a method and apparatus for encoding a signal into a scalable bitstream using bit-plane coding. The invention also relates to a corresponding method and apparatus for decoding such scalable bitstream. The invention more particularly relates to bit-plane compression of DCT coefficients in scalable DCT-based image compression.

BACKGROUND OF THE INVENTION

A prior art method of scalable DCT-based image compression is disclosed in International Patent Application WO2005/112467. The method is envisaged for use in wireless transmission of High Definition television signals, also referred to as WirelessHD, in particular for the purpose of invisibly connecting a wall-mounted HDTV flat screen monitor to an external HDTV signal source.

In experimental evaluations of the prior art compression method in the context of WirelessHD, the inventors found that an improvement of the compression performance was desired for certain computer-graphics content. For WirelessHD, both natural image content and graphics content should be supported, but the method prior art was designed for compression of natural image content and not optimized specifically for graphics content.

OBJECT AND SUMMARY OF THE INVENTION

The present invention is aimed at improving the performance of the prior art scalable compression method, such that a single compression method can be used for both natural and graphics content. This would considerably simplify the design and lower the complexity of a WirelessHD implementation.

In a first aspect, the invention defines a method of encoding a signal comprising blocks of values, in order to obtain a scalable bitstream. Each block is represented as a sequence of bit planes, wherein the most significant bits of said values form a most significant bit plane, and the respective less significant bits of said values form respective less significant bit planes. For each bit plane, a partition is created according to a selected one out of a plurality of methods, in such a way that the selected partition encloses all set bits. Transmitted to the bitstream are an identifier identifying the selected method and data representing bits of the partition. The method is preferably applied to blocks of transform coefficients.

With the invention is achieved that an optimal partitioning strategy can be selected for each individual bit plane. Examples of partitions are a rectangular partition defined by its highest row number and highest column number, a rectangular partition defined by its lowest row number and lowest column number, a one-dimensional scan defined by its highest order number, a one-dimensional scan defined by its lowest order number, the pattern of positions for which bits have already been sent in preceding bit planes.

The latter example is particularly advantageous, since no further properties of the partition such as size or location need to be added to the bitstream.

In a further embodiment of the invention, the method comprises the step of transmitting, along with an actual parathion, the sign bits for new values for which no bits have yet been sent in preceding bit planes.

In a second aspect, the invention defines a corresponding method of decoding such an encoded signal. The signal is received in the form of a possibly truncated bitstream so that one or more less significant bit planes may be missing. For each received bit plane, the partition of the bit plane is reconstructed on basis of the identifier and the data representing bits of the bit plane in the partition.

The invention further defines corresponding encoding and decoding devices, as well as a (possibly truncated) bitstream representing the encoded signal.

DESCRIPTION OF EMBODIMENTS

Figure 1:
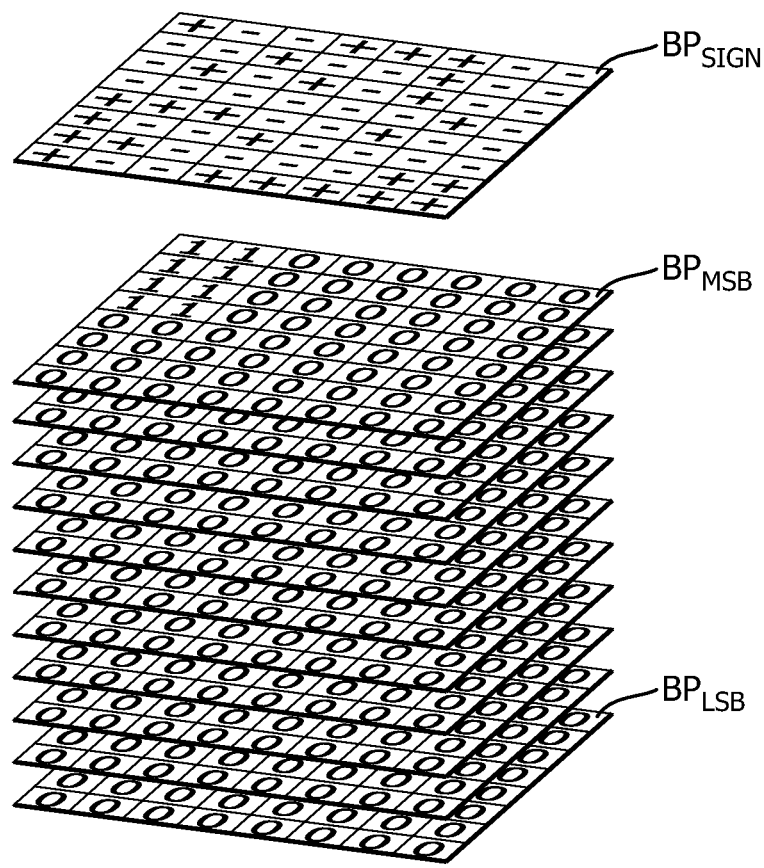
FIG. 1 shows the bit layer structure of a block of values.

FIG. 1 illustrates the bit layer structure of a block of values, for example, the DCT coefficients of an image block. The bit layer structure comprises a sign plane $BP_{SIGN}$ and eleven bit planes from the most significant bit plane $BP_{MSB}$ to the least significant bit plane $BP_{LSB}$. In this example, the DCT coefficients can range from −2047 to 2047. Each bit plane comprises bits with a specific significance. A one (or non-zero) bit in a bit plane is hereinafter referred to as a "set" bit. Obviously, the meaning of one and zero may be reversed.

A given layer in FIG. 1 contains more energy than all layers with lower significance together. In order to extract the most important information first, the information block is processed bit plane by bit plane, starting with the most important bit plane $BP_{MSB}$. An exception from this rule may be that the DC coefficient, which is normally most important, is sent in its entirety first. This resulting bitstream is scalable in the sense that it may be truncated at any position. The later the bitstream is truncated, the smaller the residual error when the image is reconstructed.

Figures 2, 3:
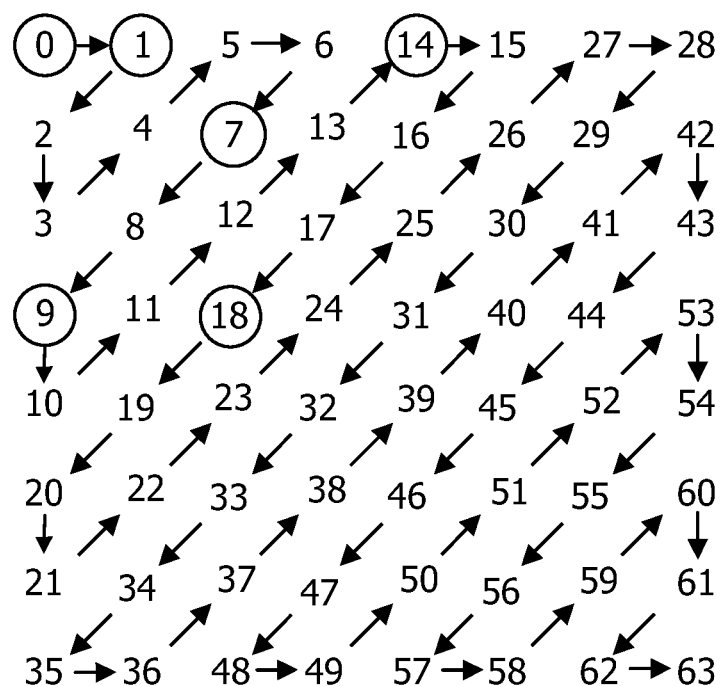
FIGS. 2 and 3 show examples of partitioning schemes that can be used in the encoding method according to the invention.

In each bit plane, an area of the bit plane is selected that encloses all set bits of the bit plane. In the prior art method, said area (further referred to as zone or partition) is selected in accordance with a predetermined partitioning scheme. FIGS. 2 and 3 show examples of partitioning schemes taken from WO 2005/112467.

FIG. 2 illustrates a two-dimensional rectangular zone that encloses all the set bits of the bit plane. The partition is defined by a highest row number $R_{MAX}$ and a highest column number $C_{MAX}$. The partition shown in FIG. 2 is thus defined by $R_{MAX}=3$, $C_{MAX}=4$, and comprises 20 bits, six of which are set.

FIG. 3 illustrates a one-dimensional partition. This partition follows a predetermined zigzag shaped path over the bit plane. In this case, the partition is defined by the highest order number $S_{MAX}$ having a set bit. In FIG. 3, in which the positions of set bits (cf. FIG. 2) have been encircled, the partition is defined by $S_{MAX}=18$. The zone comprises 19 positions, six of which are set. It should be noted that the illustrated position order, although preferred, is only an example. Other position orders are feasible.

The partitions shown in FIGS. 2 and 3 constitute a contiguous bit plane area. It is also possible to use a discontinuous partition.

In the prior art method, parameters of the predetermined partition (the parameters $R_{MAX}$, $C_{MAX}$ for the two-dimensional rectangular zone, the parameter $S_{MAX}$ for the one-dimensional partition) and the bit values for all coefficients in the partition are sent. Further, the sign bits of "new" coefficients, if any, are sent. New coefficients are those coefficients in the partition that have not yet been dealt with in a preceding bit plane, that is, they are at positions outside previously transmitted bit plane partitions. Obviously, all coefficients in the $BP_{MSB}$ partition are new. Thereafter, the method proceeds to the next bit plane, until all bit planes have been processed.

The challenge in bit-plane coding is to find the most efficient way of transmitting the bit plane contents to the decoder. For natural image content, it has turned out that the above described ($R_{MAX}$,$C_{MAX}$) or $S_{MAX}$ zones provide a good solution. However, by analyzing a variety of computer graphics images, the inventors found that the DCT coefficient bit planes for such content are not always efficiently compressed by the known rectangular or linear zone patterns.

Therefore, it is proposed to add additional patterns for bit plane coding that better match the bit plane patterns of graphics content. Instead of using a single fixed method (or single pattern) for coding all bit planes, the encoder now selects one of several alternative methods/patterns, and transmits to the decoder an identifier to indicate which method (e.g. a rectangular or one-dimensional partition) was selected plus parameters, if any, of the selected method/pattern (such as $R_{MAX}$, $C_{MAX}$ or $S_{MAX}$, respectively), followed by the bit plane information compressed using the selected method. This method is referred to as SMART (Selection of Multiple AlteRnaTives).

Figure 4:
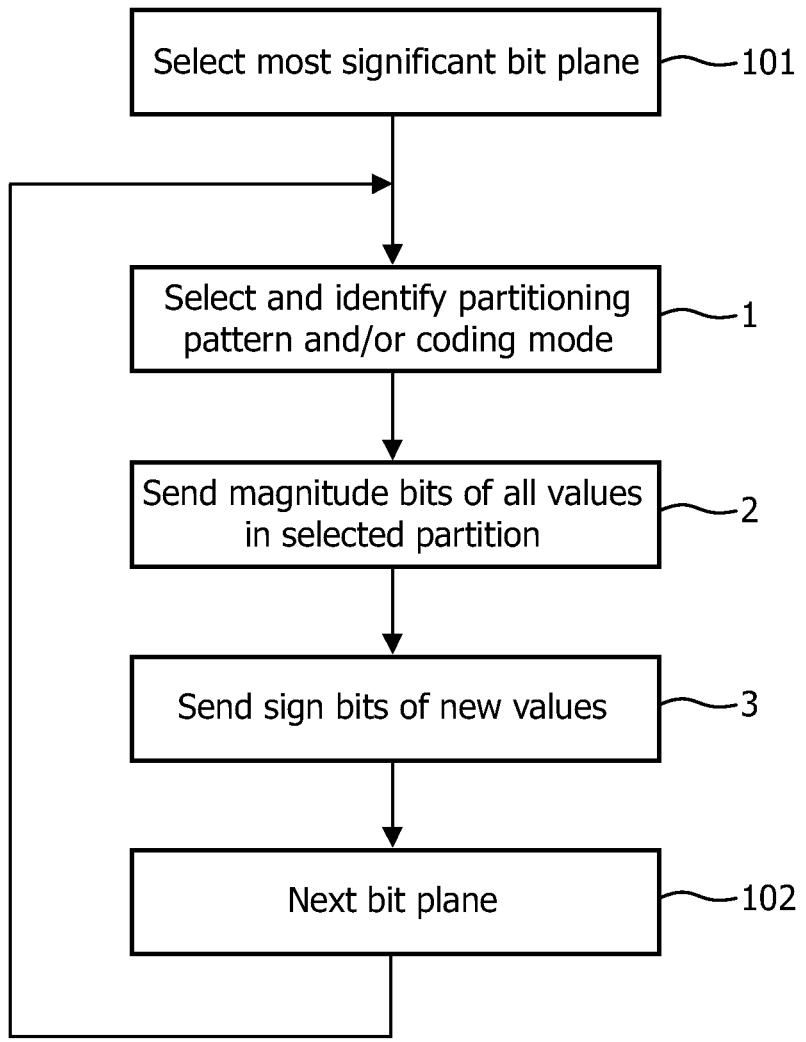
FIG. 4 shows a flow diagram to illustrate the general flow of compression in accordance with the invention.

The general flow of compression in accordance with the invention is illustrated in FIG. 4. For each bit plane (steps 101, 102) of a DCT coefficient block the following data is sent:

In a step 1, an identifier to identify which partitioning pattern and/or coding method for the partition has been selected. Note that the pattern/coding method may be different for different bit planes of the same DCT block.

In a step 2, the magnitude bits in the current bit plane for each coefficient, using the selected compression pattern/method.

In a step 3, the sign bit of each coefficient that became significant in the current bit plane. A coefficient becomes significant in a bit plane if it has a set bit for the first time in that bit plane. Obviously, this requires the encoder to keep track of the positions of these coefficients.

Advantageously, the DC coefficient is treated separately, so a magnitude bit for the DC coefficient is not sent using the above method but sent separately.

An alternative for step 2 would be not to send the magnitude bits of all the coefficients of the current partition, but only the magnitude bits of the coefficients that became significant in the current bit plane (have a set bit for the first time in this bit plane) and the coefficients that became significant in an earlier bit plane.

An alternative for step 3 would be to send the sign bits of all coefficients in the partition (and make them significant) as was done in the prior art compression method. In this case, having a non-zero magnitude bit in a bit plane is not a condition for a coefficient to become significant. The sign bit of a coefficient is now sent as soon as the coefficient appears in a partition for the first time. It leads to a somewhat simpler implementation (because of less data-dependencies), but can be inefficient when the zone/pattern does not match the data well (which was found to be the case for certain graphics content using the prior art method).

In an advantageous embodiment, it is checked whether the current bit plane comprises new coefficients. If there are no new significant coefficients, then only a refinement bit is sent for the previously significant coefficients. In this embodiment, the selected partition is in fact the pattern of positions of previously significant coefficients, i.e. the coefficients for which the sign bits have been sent in preceding bit planes. This is identified as such in step 1. No further data as to the form of partition or parameters thereof need to be transmitted. Obviously, this requires the encoder as well as the decoder to keep track of the positions of significant coefficients. If there are new significant coefficients in the current bit plane, the smallest zone containing all non-zero bits (for example, an $R_{MAX}$,$C_{MAX}$ zone pattern) is found and transmitted as described before, followed by the magnitude bit of each coefficient inside that zone (possibly except for the DC coefficient, as explained above).

As regards step 1, alternative or additional compression zones/patterns to the already mentioned rectangular (RMAX, CMAX) pattern and linear SMAX pattern are:

1. A data-adaptive pattern containing all coefficients within a certain distance (e.g. Manhattan or Euclidean) of the currently known significant coefficients. The motivation for this pattern is that often coefficients become significant that are close to already known significant coefficients. This is a generalization of the advantageous embodiment mentioned above, which uses only coefficients at distance zero from the currently significant coefficients.

2. The same as under 1, but now restricted to a certain direction. E.g. only "neighbors" in a vertical direction are considered. (or only in a horizontal or diagonal direction).

3. The same as under 1 and 2, but excluding certain coefficients. In particular e.g. containing neighbors at only "even" distances (0, 2, 4, . . . ), so excluding neighbors at odd distances (1, 3, . . . ).

4. An SMAX zone using an alternate scan order).

5. An RMIN,CMIN (or SMIN) zone pattern starting from the highest frequency (instead of from DC).

6. An alternative known bit-plane coding approach, such as e.g. the (RUN,EOP) method described in International Patent Application WO2003/045067 or the MPEG4-FGS standard or public literature.

Of course, the larger the choice of compression methods, the higher the overhead for identifying the selected method will be. However, typically the gain of using a better fitting zone/pattern is much higher than the overhead to identify the method. Furthermore, additional entropy coding (e.g. arithmetic coding) could be applied to further reduce the identifier information overhead.

Figure 5:
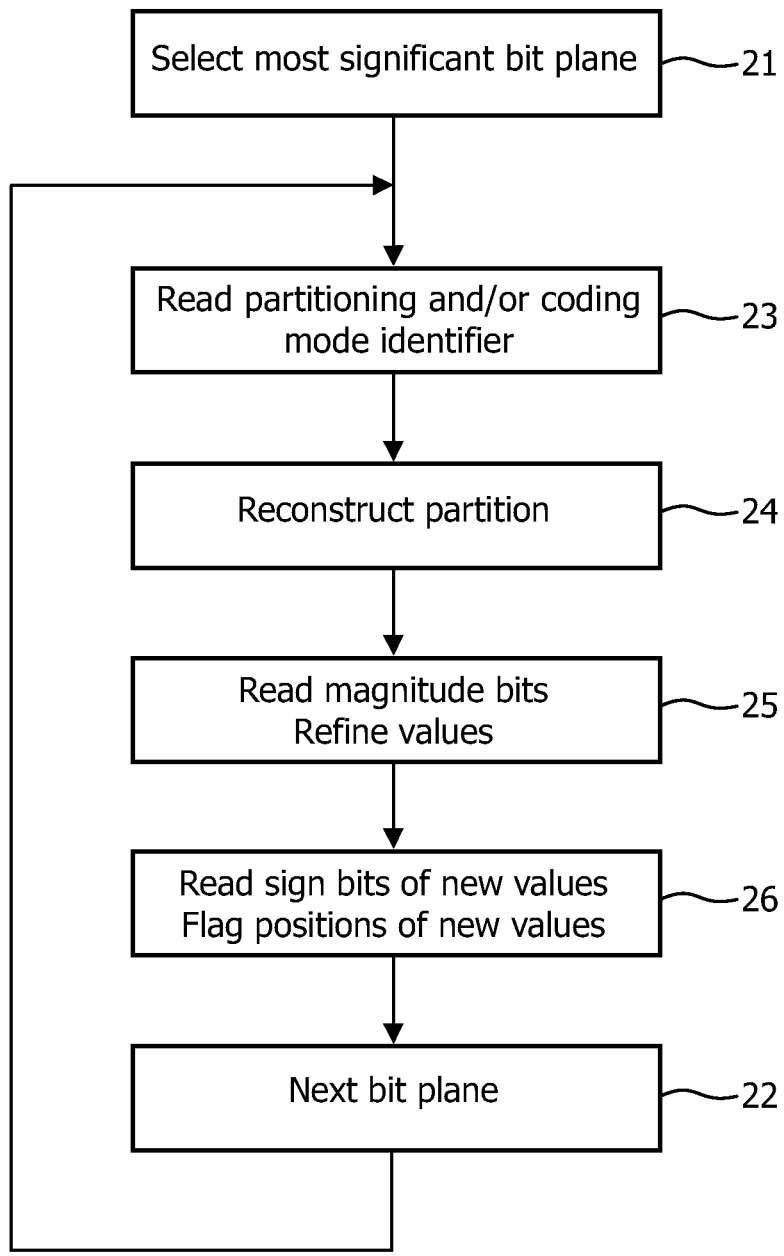
FIG. 5 shows a flow diagram illustrating the decompression of a bit stream by a decoder.

Obviously, a decoder carries out the reverse operations to reconstruct the original or, if the received bitstream is truncated, the most important part of the original block of values. FIG. 5 shows a flow diagram illustrating the operations carried out by the decoder. For each bit plane (steps 21,22), the following steps are performed.

In step 23, the identifier identifying the selected partitioning pattern and/or coding mode is received as well as parameters for such zone (such as $R_{MAX}$, $C_{MAX}$, $R_{MIN}$, $C_{MIN}$ for rectangular zones, $S_{MAX}$, $S_{MIN}$ for linear zones), if any.

In step 24, the current partition is reconstructed from its identifier and parameters. Note that that the identifier may have indicated that there are no new coefficients in the current bit plane and that the partition is defined by the positions of the previously significant coefficients. In that case, the decoder reconstructs the partion from the positions of the previously significant coefficients (of which the decoder has kept a record in step 26, see below).

Knowing the partition, the decoder now knows how many subsequent bits in the bit stream are magnitude bits. In step 25, the decoder reads them from the bit stream and refines the respective coefficients accordingly.

Having kept track of the coefficients that have already been dealt with before, the decoder now also knows for how many and which coefficients a magnitude bit has just been received for the very first time. For these new coefficients, if any, the sign bits are subsequently received in step 26. In this step, the sign bits are assigned to the respective coefficients and their respective positions are being flagged as significant.

In summary, the invention relates to a bit-plane coding method of signals, for example, an image or video signal in the DCT transform domain. The bit planes of the DCT blocks are transmitted bit-plane by bit-plane in order of significance. As each plane contains more signal energy than the lower significant layers together, the resulting bitstream is scalable in the sense that it may be truncated at any position. The later the bitstream is truncated, the smaller the residual error when the image is reconstructed.

For each bit plane, a zone or partition of bit plane is created that encompasses all the non-zero bits of the DCT coefficients in that bit plane. The partition is created in accordance with a strategy that is selected from a number of options in dependence of the content of the overall signal and/or the actual bit plane. A different zoning strategy may be used for natural images than for graphic content, and the strategy may vary from bit plane to bit plane. The form as well as other properties such as size of each partition can thus be optimally adapted to the content. Two-dimensional rectangular zones and one-dimensional zigzag scan zones may be mixed within an image or even within a DCT block. The selected zone creating strategy is embedded in the bitstream, along with the DCT coefficient bits in the actual partition.

The invention claimed is:

1. A method of encoding a signal, comprising blocks of values in order to obtain a bitstream, the method comprising the steps of:
   representing a block as a sequence of bit planes, wherein the most significant bits of said values form a most significant bit plane, and the respective less significant bits of said values form respective less significant bit planes;
   creating, for each bit plane, a partition of said bit plane according to one out of a plurality of methods and patterns selected to create such partition with bit plane coding adapted to bit plane content that matches one selected from the group consisting of natural images and graphic content, further in which a different zoning strategy is used for natural images than for graphic content, such that the created partition encloses all set bits; and
   transmitting to said bitstream, for each created partition, (i) an identifier identifying the method and pattern selected to create the partition, (ii) parameters of the selected method and pattern, and (iii) data representing bits of said created partition.

2. A method according to claim 1, wherein said blocks of values comprise transform coefficients representing said signal.

3. A method as claimed in claim 1, wherein said plurality of methods of creating a partition includes creating a rectangular partition defined by its highest row number ($R_{MAX}$) and highest column number ($C_{MAX}$).

4. A method as claimed in claim 1, wherein said plurality of methods of creating a partition includes creating a rectangular partition defined by its lowest row number ($R_{MIN}$) and lowest column number ($C_{MIN}$).

5. A method as claimed in claim 1, wherein said plurality of methods of creating a partition includes creating a partition corresponding to a one-dimensional scan of the bit plane and defined by the highest order number ($S_{MAX}$) of the position having a set bit.

6. A method as claimed in claim 1, wherein said plurality of methods of creating a partition includes creating a partition corresponding to a one-dimensional scan of the bit plane and defined by the lowest order number ($S_{MIN}$) of the position having a set bit.

7. A method as claimed in claim 1, further comprising the step of transmitting, along with an actual partition, the sign bits of at least the values having a set bit for the first time in the current bit plane.

8. A method as claimed in claim 7, wherein said plurality of methods of creating a partition includes identifying as partition for the current bit plane the pattern of positions of values of which the sign bits have been sent in preceding bit planes.

9. A device for encoding a signal, the device being arranged to carry out the method as claimed in claim 1.

10. A method of decoding an encoded signal received in the form of a possibly truncated bitstream, the signal comprising blocks of values, the method comprising the steps of:
    representing a block of values to be reconstructed as a sequence of bit planes, wherein the most significant bits of said values form a most significant bit plane, and the respective less significant bits of said values form respective less significant bit planes;
    receiving, for successive bit planes, (i) an identifier identifying a selected method and pattern out of a plurality of methods and patterns to create a partition of the bit plane with bit plane coding adapted to bit plane content that matches one selected from the group consisting of natural images and graphic content, further in which a different zoning strategy is used for natural images than for graphic content, (ii) parameters of the selected method and pattern, and (iii) data representing bits of the bit plane in said partition; and
    reconstructing said partitions of the bit planes according to the respective methods and patterns, parameters, and data.

11. A method as claimed in claim 10, further comprising the step of receiving, along with an actual partition, the sign bits of at least the values having a set bit for the first time in the current bit plane.

12. A method as claimed in claim 11, wherein said step of reconstructing a partition in response to a predetermined identifier comprises reconstructing said partition as the pattern of positions of values of which the sign bits have been received in preceding bit planes.

13. A device for decoding a signal, the device being arranged to carry out the method as claimed in claim 10.

* * * * *